(12) United States Patent  (10) Patent No.: US 7,817,921 B2
Rapp et al.  (45) Date of Patent: Oct. 19, 2010

(54) DETERMINATION OF THE AMPLIFIED SPONTANEOUS EMISSION IN AN OPTICAL FIBRE AMPLIFIER

(75) Inventors: Lutz Rapp, Deisenhofen (DE); Wolfgang Peisl, Munich (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 691 days.

(21) Appl. No.: 11/664,177

(22) PCT Filed: Sep. 26, 2005

(86) PCT No.: PCT/EP2005/054808

§ 371 (c)(1),
(2), (4) Date: Mar. 29, 2007

(87) PCT Pub. No.: WO2006/035009

PCT Pub. Date: Apr. 6, 2006

(65) Prior Publication Data

US 2007/0269209 A1  Nov. 22, 2007

(30) Foreign Application Priority Data

Sep. 30, 2004  (DE) .................. 10 2004 047 745

(51) Int. Cl.
*H04B 10/12* (2006.01)
*H01S 3/00* (2006.01)
(52) U.S. Cl. .................. 398/177; 398/158; 398/160
(58) Field of Classification Search .................. 398/160, 398/177, 158
See application file for complete search history.

(56) References Cited

U.S. PATENT DOCUMENTS 5,117,303 A * 5/1992 Desurvire et al. ........ 359/341.1

(Continued)

FOREIGN PATENT DOCUMENTS

EP  1 085 683 A1  3/2001

(Continued)

OTHER PUBLICATIONS

"Inversion", Academic Press Dictionary of Science and Technology, 1996.*

(Continued)

*Primary Examiner*—Ken N Vanderpuye
*Assistant Examiner*—Danny W Leung
(74) *Attorney, Agent, or Firm*—Laurence A. Greenberg; Werner H. Stemer; Ralph E. Locher

(57) ABSTRACT

In a method for determining a power of an amplified spontaneous emission in an optical fiber amplifier for a WDM signal, wherein the optical fiber amplifier includes at least a first amplifier stage having a predetermined output power set for a measured input power, a first mean inversion is determined for the first amplifier stage. A first output power of the amplified spontaneous emission is determined at an output of the first amplifier stage by reference to tabulated values which depend on the first mean inversion.

13 Claims, 2 Drawing Sheets

U.S. PATENT DOCUMENTS

| | | | |
|---|---|---|---|
| 5,471,334 A * | 11/1995 | Masuda et al. ............... 359/337 |
| 5,986,789 A * | 11/1999 | Kawai et al. ................. 398/147 |
| 6,064,501 A * | 5/2000 | Roberts et al. ................ 398/11 |
| 6,365,891 B1 * | 4/2002 | Hodgson et al. ....... 250/227.14 |
| 6,421,172 B1 * | 7/2002 | Flood et al. ............ 359/341.41 |
| 6,459,526 B1 * | 10/2002 | Minelly et al. ........... 359/337.1 |
| 6,556,340 B1 * | 4/2003 | Wysocki et al. ............. 359/334 |
| 6,556,345 B1 * | 4/2003 | Gassner et al. ........... 359/341.4 |
| 6,633,429 B2 * | 10/2003 | Kinoshita et al. ........ 359/337.1 |
| 6,687,049 B1 * | 2/2004 | Sulhoff et al. ............ 359/341.4 |
| 6,690,505 B1 * | 2/2004 | Ye .............................. 359/337 |
| 6,882,466 B1 * | 4/2005 | Shimojoh et al. ........... 359/334 |
| 6,900,934 B2 * | 5/2005 | Lelic .................... 359/341.41 |
| 6,934,076 B1 * | 8/2005 | Goobar et al. ............... 359/337 |
| 6,943,937 B2 * | 9/2005 | Lelic et al. ............. 359/337.11 |
| 7,019,894 B1 * | 3/2006 | Stentz et al. ........... 359/341.41 |
| 7,061,667 B2 * | 6/2006 | Pegg ........................ 359/341.1 |
| 7,081,988 B2 * | 7/2006 | Charlet et al. .......... 359/337.11 |
| 7,088,496 B2 * | 8/2006 | Rapp .......................... 359/337 |
| 7,379,234 B2 * | 5/2008 | Rapp .......................... 359/337 |
| 7,394,590 B2 * | 7/2008 | Iizuka et al. ................ 359/337 |
| 7,480,092 B2 * | 1/2009 | Kinoshita et al. ...... 359/341.41 |
| 2003/0117696 A1 * | 6/2003 | Goobar et al. ........... 359/337.2 |
| 2007/0269209 A1 * | 11/2007 | Rapp et al. ..................... 398/34 |

FOREIGN PATENT DOCUMENTS

EP        1 130 802 A1     9/2001

OTHER PUBLICATIONS

Flood F. A.: Temperature dependent behaviour of C-band and L-band EDFAs: A comparison; Electronics Letters, IEE Stevenage, GB; vol. 35, No. 12; Jun. 10, 1999; XP-006012256 ISSN: 0013-5194 Table 1.

* cited by examiner

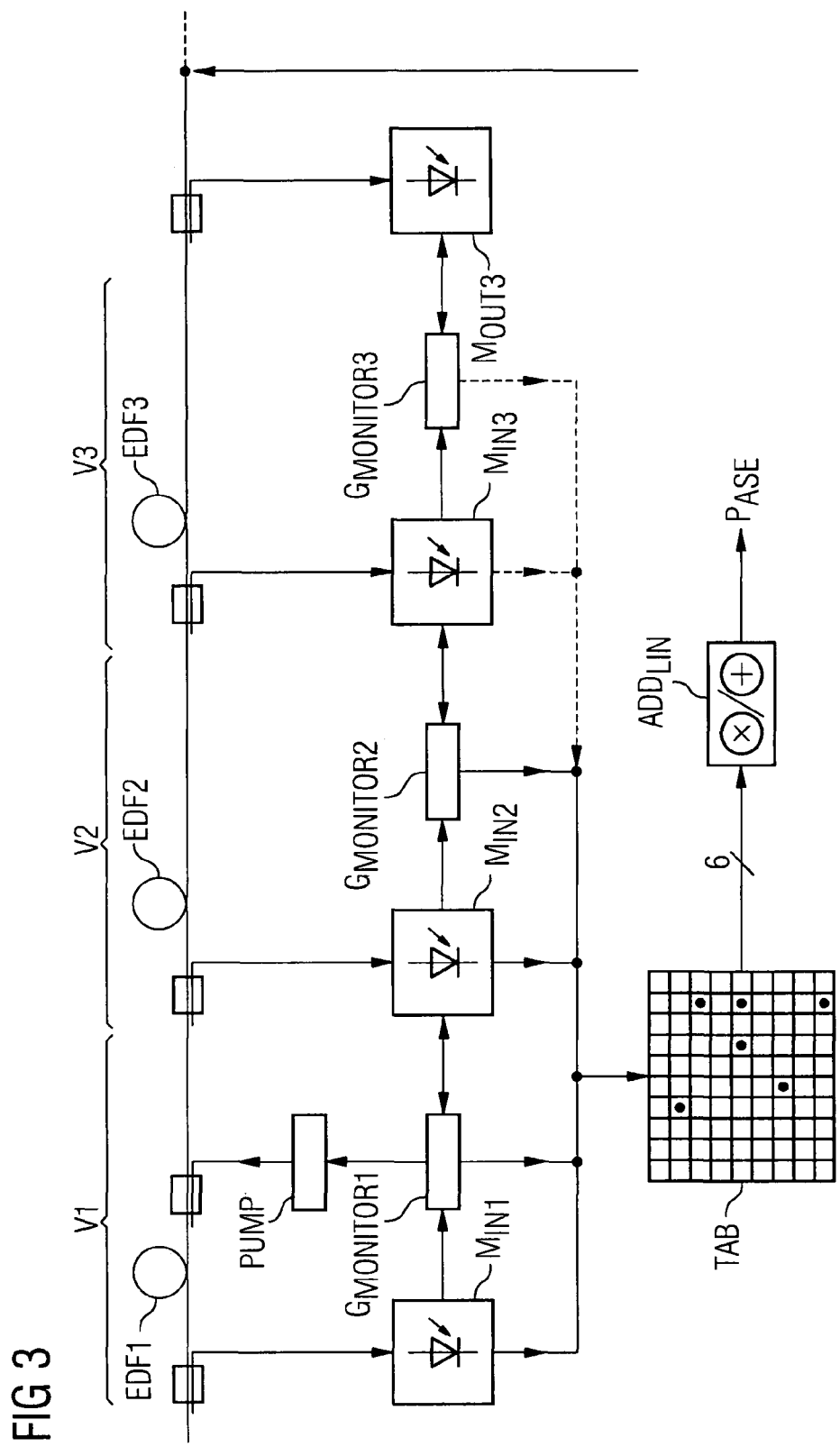

DETERMINATION OF THE AMPLIFIED SPONTANEOUS EMISSION IN AN OPTICAL FIBRE AMPLIFIER

BACKGROUND OF THE INVENTION

The invention relates to a method for determining an amplified spontaneous emission (ASE) in an optical fiber amplifier, an associated data medium, and a single-stage and a multi-stage optical fiber amplifier.

Modern Erbium-doped fiber amplifiers for WDM systems with very large ranges generally have three amplifier stages with amplification fibers, which are separated by components such as variable attenuators and dispersion-compensating fibers, and have a combined gain and output power regulator.

For the purpose of measuring total signal power at the amplifier's input and the output, photodiodes are generally used, although their measurement signals can be corrupted because the signals are overlaid with noise in the form of amplified spontaneous emission, ASE. The relative error produced by this can be large, above all when a WDM (WDM=Wavelength Division Multiplex) signal which is to be amplified has a small number of channels, in particular because modern receivers with improved error-correction methods (such as using EFEC=Enhanced Forward Error Correction) permit low signal-to-noise ratios.

In order to be able to set the required signal output power, it is therefore necessary to correct the measurement signal for the overlaid amplified spontaneous emission, ASE, by estimating as accurately as possible the amplified spontaneous emission ASE generated in the individual amplifiers.

The known methods use the following approximation for calculating the ASE power (power of the amplified spontaneous emission, ASE) produced in an EDFA (C-band amplifier with an optical bandwidth $B_{opt}$=4.44 THz):

$$P^{ASE} = \hbar v \cdot B_{opt} \cdot nf \cdot g = 0.57045 \cdot 10^{-3} \cdot nf \cdot g \{MW\}$$

where $B_{out}$ stands for the optical bandwidth, v is the mean carrier frequency of the signals (typically: 193.40 THz, 1550 nm), the variable g represents the EDFA gain and nf is the EDFA noise figure.

In general, the EDFA noise figure nf is available in tabular form for a few operating points, in terms of the EDFA input power and the EDFA gain, for 40-channel mode. An exact calculation of the ASE power generated is therefore not possible, because:

variation in the passive losses in the EDFA can produce significant changes,
spectral shaping factors (e.g. for the gain-flattening filter used) are left out of consideration,
for operation with a low number of channels (1 . . . 10) the EDFA noise figure can deviate significantly from the tabulated values for 40-channel operation, i.e. the noise figure depends not only on the input power and on the gain but also on the actual channel usage.

In the case of a three-stage optical fiber amplifier, any characterization of the amplifier simply as a function of the overall gain from the input to the output and as a function of the input power relatively quickly runs up against accuracy limits, because for a given gain the passive losses between the individual stages can vary greatly, which has a strong influence on the ASE power produced.

SUMMARY OF THE INVENTION

The object of the present invention is to specify a method with which the amplified spontaneous emission, ASE, produced in a single- to multi-stage fiber amplifier, EDFA, can be determined with high accuracy.

Accordingly, one aspect involves a method for determining a power of an amplified spontaneous emission is an optical fiber amplifier for a WDM signal, wherein the optical fiber amplifier includes at least a first amplifier stage having a predetermined output power set for a measured input power. From the output power, a first mean inversion is determined for the first amplifier stage. A first output power of the amplified spontaneous emission is determined at an output of the first amplifier stage by reference to tabulated values which depend on the first mean inversions.

Another aspect involves an optical fiber amplifier having an amplifier stage, a first power measurement facility coupled to an input of the amplifier stage, and an arrangement for determining a mean inversion, coupled to the first amplifier stage and configured to use one of a second power measurement facility on an output side, and a preset gain controller. Output signals from the first power measurement facility and from the arrangement for determining the mean inversion are fed to a table, in which calibrated values of the power values of an amplified spontaneous emission are stored.

Advantageous developments of the invention are specified in the sub-claims.

The method in accordance with the invention for the determination, i.e. for determination of the power, of the amplified spontaneous emission, ASE, in an optical fiber amplifier, i.e. with an arbitrarily large number of serially connected amplification stages (having at least one pumped amplification fiber), is based on a concept, if necessary on an approximation, which can be derived by reference to a single-stage fiber amplifier. It can actually be shown that, for an amplifier stage with a constant mean inversion or constant gain, the amplified spontaneous emission generated in this amplifier stage is virtually independent of the input power. This fact makes it very suitable for determining the ASE power (=power of the amplified spontaneous emission, ASE) of the individual amplifier stage.

In the case of multi-stage amplifier stages in an optical fiber amplifier, it is possible for the first time to compute the contributions (in terms of the power) of all the individual amplifier stages in accordance with the earlier concept. Further, effects of the ASE contributions from any one amplifier stage on another amplifier stage, are also determined.

At the output from the overall fiber amplifier, the total amplified spontaneous emission, ASE, is simply and rapidly determined as a sum of ASE contributions generated in the individual amplifier stages, multiplied by the transmission functions of downstream components.

It is further shown that the determination of the individual terms of the summation can be effected with the help of a small number of parameters, which serve as predefined values for the method. E.g. for a three-stage fiber amplifier, starting from only 2 inversion values, only 6 parameters are required in conjunction with an input power to determine directly, by reference to a table (to supply the predefined values), all the 6 contributions to the ASE power. This table can be generated at the start of the commissioning of the optical fiber amplifier or directly on completion of the amplifier card (with the integral optical fiber amplifier), as applicable, by means of a calibration procedure, and can also be regularly updated during operation (e.g. to take into account ageing effects). The term "table" should here be understood in a general sense. The predefined values could also, for example, be stored electronically on a smart card, in a form completely different from a table. The main point is that the predefined values are known as a function of one, or possibly several, inversion(s) for one or more amplifier stage(s).

Several exemplary embodiments of the invention, based on a single-stage; a two-stage and a three-stage fiber amplifier, are explained in more detail below, in respect of their methodical aspects and equipment aspects. From these, a person skilled in the art could deduce how to make a determination in accordance with the invention of the overall amplified spontaneous emission for a fiber amplifier with an arbitrary number of stages.

The method can also be applied for an optical transmission system with at least one transmission fiber and at least one switched optical fiber amplifier.

In what follows, it is assumed that the spectral shape of the spectrum at the input to the optical fiber amplifier is known, or at least an estimate is available. A closed-loop controller adjusts the powers of pump signals so as to ensure adherence to certain boundary conditions for the powers of the signals which are to be amplified at the outputs of the individual amplifiers. So it is, for example, logical in relation to non-linear effects to select the gain of a second amplifier stage in such a way that the strongest channel signal level has a certain optimal power value at the input to a dispersion-compensating fiber.

Insofar as the gain profile of individual amplifier stages, e.g. of an Erbium-doped fiber amplifier, EDFA, has been characterized, it is possible to determine for each amplifier stage the mean inversion which should be set. Using this characteristic data, the ASE power generated in an Erbium-doped fiber amplifier, EDFA, can be determined at individual measurement points, and thus the desired signal power determined with great accuracy.

BRIEF DESCRIPTION OF THE SEVERAL VIEWS OF THE DRAWINGS

These and other aspects, advantages and novel features of the embodiments described herein will become apparent upon reading the following detailed description and upon reference to the accompanying drawings. In the drawings, same elements have the same reference numerals. In the following list of figures.

DETAILED DESCRIPTION OF THE INVENTION

Figure 1:
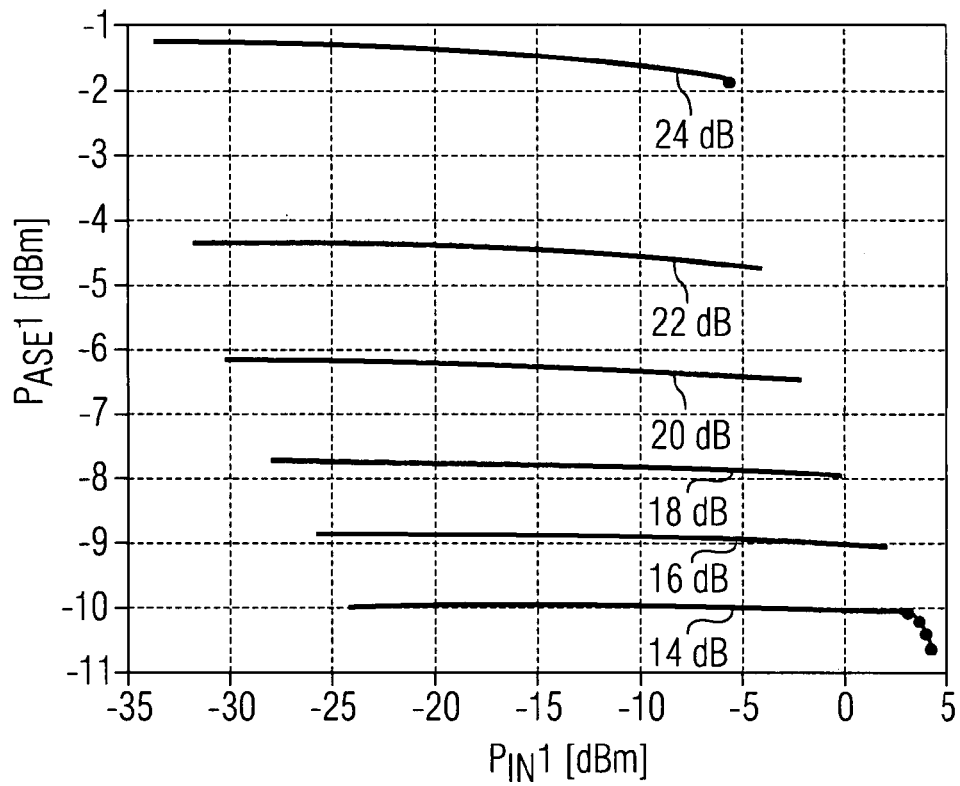
FIG. 1 the ASE power generated in an amplifier stage as a function of the input power for various gain values, FIG. 2 a single-stage optical fiber amplifier, FIG. 3 a three-stage optical fiber amplifier.

FIG. 1 shows, as a function of the input power $P_{IN}1$ for the optical signal entering the fiber amplifier, six profiles for the ASE power, $P_{ASE}$, of the amplified spontaneous emission, ASE, generated in an individual amplifier stage of a single-stage fiber amplifier, corresponding to gain values of G=14, 16, 18, 20, 22, 24 dB. The gain of an amplifier stage with one amplification fiber (e.g. an Erbium-doped fiber) depends solely on the mean value of the inversion $\chi$ for this amplifier stage, but not on the shape of its graph. To a good approximation, this can also be assumed for the ASE power generated in an amplifier stage with a pump. For all of the points on any one of the six curves, the mean inversion of the Erbium-doped fiber was held constant. Over a very wide range of input signal powers, the ASE generated is constant and only at very high powers does the ASE power decline. Considering that an ASE correction is only important for small input signal powers, the dependence of the noise power on the input power can be neglected in determining the ASE. In some circumstances, even the limited dependence on the input power can still be taken into consideration.

From FIG. 1 we now calculate, as a first exemplary embodiment, the output power $P_{11}^{ASE}$ of the amplified spontaneous emission, ASE, at the output from the first amplifier stage V1 of a single-stage fiber amplifier.

In accordance with the method, a prescribed output power $P_{OUT}1$ is set for a measured input power $P_{IN}1$, and from this is determined a mean inversion $\chi_I$ for the amplifier stage V1.

Such a procedure can also be effected by setting a prescribed gain value instead of the output power $P_{OUT}1$. Settings of this type at the end of the amplifier stage are important, e.g. to ensure that too high or too low signal levels, as applicable, do not occur at the output of the fiber amplifier.

In other words, as shown in FIG. 1 the output power $P_{11}^{ASE}$ of the amplified spontaneous emission, ASE, is immediately determined from a knowledge of:

the input power and the mean inversion, or
the input power and the gain value, or
the input power and the output power.

For example, in the first amplifier stage V1 an ASE power of $P_{11}^{ASE}$ can be generated, with a noise-power density of $S_I^{ASE}(\lambda,\chi_I)$, this being dependent on the mean inversion $\chi_I$ of the first amplifier stage V1. Its contribution to the total ASE power $P_{ASE}1$ at the output from the first amplifier stage V1 amounts to:

$$P_{11}^{ASE} = \int_{\lambda_0}^{\lambda_1} S_I^{ASE}(\lambda, \chi_I) d\lambda = \tau_{11}(\chi_I)$$

where the interval $[\lambda_0, \lambda_1]$ is that range of wavelengths in which power components large enough to need consideration occur, and the first parameter $\tau_{11}(\chi_I)$ is a function of the first mean inversion $\chi_I$.

If the values of the first parameter $\tau_{11}(\chi_I)$ have been stored in a table as a function of the mean inversion $\chi_I$, it is possible to immediately determine a first output power $P_{11}^{ASE}$ for the amplified spontaneous emission ASE at the output from the first amplifier stage V1. In the case of a single-stage fiber amplifier, the total ASE power $P_{ASE}1$ is exactly the contribution $P_{11}^{ASE}$.

An optical two-stage fiber amplifier is now considered. The ASE power at the output from the first stage is calculated as described above for the single-stage case.

Now, the first amplifier stage V1 also contributes to the ASE power at the output from the second amplifier stage V2. In total, the ASE power at the output from the first stage is made up of two contributions $P_{12}^{ASE}$ and $P_{22}^{ASE}$, which take into account respectively the ASE generated in the first stage and the ASE generated in the second stage.

The contribution of the first stage to the total ASE power at the amplifier output can be calculated as follows:

$$P_{12}^{ASE} = \int_{\lambda_0}^{\lambda_1} S_I^{ASE}(\lambda, \chi_I) G_{II}^{ASE}(\lambda, \chi_{II}) a_I d\lambda = a_I \tau_{12}(\chi_I, \chi_{II}),$$

where $G_{II}^{ASE}(\lambda,\chi_{II})$ is the gain of the second amplifier stage V2 with a mean inversion of $\chi_{II}$ for the second amplifier stage V2, $a_I$ is the attenuation between the first and the second amplifier stages and the parameter $\tau_{12}(\chi_I,\chi_{II})$ represents a function of the two mean inversions $\chi_I, \chi_{II}$.

Finally, the second amplifier stage V2 contributes to the total ASE power at the output from the second stage in a manner similar to that of the first amplifier stage V1 at its output, so that:

$$P_{22}^{ASE} = \int_{\lambda_0}^{\lambda_1} S_{II}^{ASE}(\lambda, \chi_{II}) d\lambda = \tau_{22}(\chi_{II})$$

where $S_{II}^{ASE}(\lambda, \chi_{II})$ represents the power density at the input to the second amplifier stage V2, and the parameter $\tau_{22}(\chi_{II})$ a function of the mean inversion $\chi_{II}$ of the second amplifier stage V2.

Since an amplifier is generally operated in its operational state with a fixed prescribed gain curve (e.g. a flat gain curve, i.e. an identical gain for all channels), the mean inversion of the two stages corresponds to a prescribed value, so that the parameters $\chi_I$ and $\chi_{II}$ are linearly interdependent. The matrix $\tau_{12}(\chi_I, \chi_{II})$ can thus in turn be reduced to a vector (depending only on a single variable). If the overall gain of all the optical amplifier stages V1, V2 is kept constant, all three parameters $\tau_{11}(\chi_I), \tau_{12}(\chi_I), \tau_{22}(\chi_I)$ depend only on the mean inversion $\chi_I$.

The total power $P_{ASE}2$ of the amplified spontaneous emission, ASE, at the output from the two-stage optical fiber amplifier is calculated by adding together the two contributions $P_{12}^{ASE}$ and $P_{22}^{ASE}$.

Further, this calculation for determining the contributions to the ASE power can be made for other multi-stage fiber amplifiers, as below for a three-stage fiber amplifier V1, V2, V3.

In this case, six contributions $P_{11}^{ASE}$, $P_{12}^{ASE}$, $P_{13}^{ASE}$, $P_{22}^{ASE}$, $P_{23}^{ASE}$, $P_{33}^{ASE}$ must be determined. The first three contributions $P_{11}^{ASE}$, $P_{12}^{ASE}$, $P_{13}^{ASE}$ are those from the first amplifier stage V1 to each amplifier stage V1, V2, V3. The next two contributions $P_{22}^{ASE}$, $P_{23}^{ASE}$ are those from the second amplifier stage V2 to the second and third amplifier stages V2, V3. The last contribution $P_{33}^{ASE}$ is that from the third amplifier stage V3 to the same, third, amplifier stage V3.

So the following relationships apply:
ASE power at the output from the first stage:

$$P_1^{ASE} = P_{11}^{ASE}$$

ASE power at the output from the second stage:

$$P_2^{ASE} = P_{12}^{ASE} + P_{22}^{ASE}$$

ASE power at the output from the third stage:

$$P_3^{ASE} = P_{13}^{ASE} + P_{23}^{ASE} + P_{33}^{ASE}$$

The contributions $P_{11}^{ASE}$, $P_{12}^{ASE}$ and $P_{22}^{ASE}$ can be calculated as in the previous exemplary embodiment with two amplifier stages:

$$P_{11}^{ASE} = \int_{\lambda_0}^{\lambda_1} S_I^{ASE}(\lambda, \chi_I) d\lambda = \tau_{11}(\chi_I)$$

$$P_{12}^{ASE} = \int_{\lambda_0}^{\lambda_1} S_I^{ASE}(\lambda, \chi_I) G_{II}^{ASE}(\lambda, \chi_{II}) a_I d\lambda = a_I \tau_{12}(\chi_I, \chi_{II})$$

$$P_{22}^{ASE} = \int_{\lambda_0}^{\lambda_1} S_{II}^{ASE}(\lambda, \chi_{II}) d\lambda = \tau_{22}(\chi_{II})$$

that is, as a function of the mean inversions $\chi_I$, $\chi_{II}$ of the first and second amplifier stages V1, V2.

The contribution $P_{13}^{ASE}$ can be calculated as follows:

$$P_{13}^{ASE} = \int_{\lambda_0}^{\lambda_1} S_I^{ASE}(\lambda, \chi_I) G_{II}^{ASE}(\lambda, \chi_{II}) G_{III}^{ASE}(\lambda, \chi_{III}) a_I a_{II} d\lambda$$

where $G_{III}^{ASE}(\lambda, \chi_{III})$, $G_{III}^{ASE}(\lambda, \chi_{III})$ represent the spectral gains of the second and third amplifier stages V2, V3 as a function of the corresponding mean inversion $\chi_{III}$ (of the third amplifier stage V3). Here, the attenuation of the second amplifier stage is represented by $a_{II}$. Because, or if, the overall gain of the optical three-stage fiber amplifier is kept constant the following equation holds:

$$G_I^{ASE}(\lambda, \chi_I) \cdot G_{II}^{ASE}(\lambda, \chi_{II}) \cdot G_{III}^{ASE}(\lambda, \chi_{III}) = G_0 = konst \text{ (=const)}$$

using which it is possible to determine the contributions, which are a function of the mean inversion $\chi_{III}$ of the third amplifier stage V3, as a function of one of or both the other mean inversions $\chi_I$, $\chi_{II}$. I.e. for an optical three-stage fiber amplifier only two inversion values are required, rather than three, to determine the six contributions to the total power of the amplified spontaneous emission ASE, as follows:

$$P_{13}^{ASE} = \int_{\lambda_0}^{\lambda_1} S_I^{ASE}(\lambda, \chi_I) \frac{G_0}{G_I^{ASE}(\lambda, \chi_I)} a_I a_{II} d\lambda = a_I a_{II} \cdot G_0 \cdot \tau_{13}(\chi_I)$$

The two other contributions $P_{23}^{ASE}$, $P_{33}^{ASE}$ can be calculated as follows:

$$P_{23}^{ASE} = \int_{\lambda_0}^{\lambda_1} S_{II}^{ASE}(\lambda, \chi_{II}) G_{III}^{ASE}(\lambda, \chi_{III}) a_{II} d\lambda$$

$$P_{33}^{ASE} = \int_{\lambda_0}^{\lambda_1} S_{III}^{ASE}(\lambda, \chi_{III}) d\lambda$$

If the overall gain of a three-stage fiber amplifier is held constant at the value $G_0$, it is also possible to calculate the last two contributions as a function of the two mean inversions $\chi_I$, $\chi_{II}$, so that $$P_{23}^{ASE} = a_{II} \tau_{23}(\chi_I, \chi_{II})$$

$$P_{33}^{ASE} = \tau_{33}(\chi_I, \chi_{II})$$

Overall, for the purpose of an exact determination of the total power $P_{ASE}3$ of the amplified spontaneous emission, ASE, in a three-stage fiber amplifier V1, V2, V3 it is possible, by means of a suitable calibration and by reference to the mean inversions of two of the amplifier stages V1, V2, V3 to tabulate (as a function of the two selected inversions) six parameters $\tau_{11}(\chi_I)$, $\tau_{12}(\chi_I)$, $\tau_{22}(\chi_I)$, $\tau_{13}(\chi_I)$, $\tau_{23}(\chi_I, \chi_{II})$, $\tau_{33}(\chi_I, \chi_{II})$.

In operation, the total ASE power at the end of the optical fiber amplifier can be determined as a function of the input power to an amplifier stage by the addition of the appropriate contributions, which are looked up in the tables. This method can be implemented by means of DSP (Digital Signal Processing) for the real-time determination of the total ASE power.

By reference to the three above exemplary embodiments, for a single-stage, a two-stage and a three-stage optical fiber amplifier, it will be obvious to a person skilled in the art how to derive further determinations of the total power of the ASE for an N-stage fiber amplifier (N>3), by the creation of suitable tables with calibrated values for $\tau_{ij}(\chi_I, \chi_{II}, \text{etc})$.

This method can also be applied for amplifier stages with transmission fibers in circuit between them. The only addition which arises is attenuation factors like the previous familiar attenuation values $a_I$, $a_{II}$. Thus one can easily and rapidly make a complete and exact determination of the ASE power at any selected point or at the end of the transmission system.

For the purpose of carrying out the method in accordance with the invention, use can be made of a data medium with a program, which can be loaded into a control module, whereby the control module carries out the above method when the program referred to is executed. This feature is very important, because the entire method can be controlled by software, making it possible to monitor or measure for the optical amplifier components of the facility, or their output signals, respectively.

The control module can have one or more local control units for at least one of the amplifier stages. This makes an exact determination of the ASE power possible, directly at the optical fiber amplifier. In combination with a power controller for the signals or the pump signals for an amplifier stage, as applicable, power adjustment can be effected autonomously at the optical amplifier.

The control module can be a part of the network management, in particular if comprehensive monitoring of a network is wanted.

The tabulated values are most conveniently stored in a DSP-based module (DSP=Digital Signal Processing), controlled by the control module. Such a module permits rapid and comprehensive access to the values in the table, and processing of them, e.g. by further addition and multiplication.

In what follows, the invention is considered from the point of view of a device. For this purpose, two exemplary embodiments are described, in which are presented a new single-stage and a new three-stage optical fiber amplifier.

Figure 2:
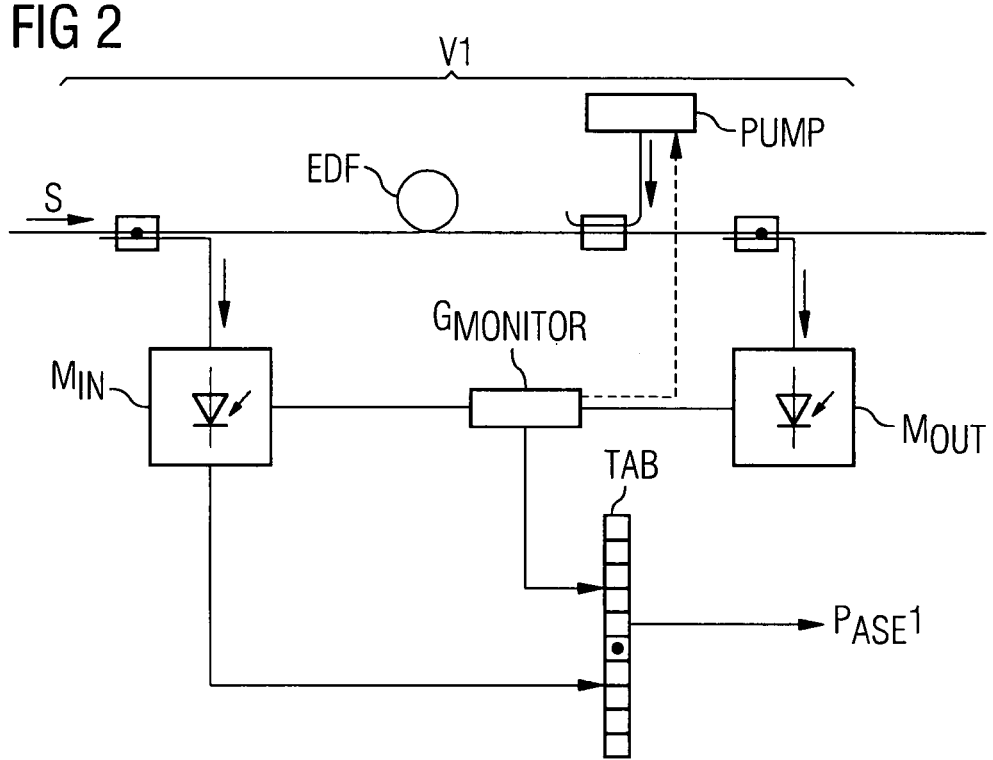

FIG. 2 shows the single-stage optical fiber amplifier with one amplifier stage V1 (Erbium-doped fiber EDF pumped by a pump source PUMP), at the input to which is assigned a first power measurement facility $M_{IN}$ together with an arrangement for determining the mean inversion using a second power measurement facility $M_{OUT}$ on the output side, or using a preset gain controller $G_{MONITOR}$ (such as e.g. an AGC=Automatic Gain Control). In this example, the gain controller $G_{MONITOR}$ controls the power of the pump source PUMP so that a setting, in terms of the gain or output power, is achieved at the output of the amplifier stage or optical fiber amplifier, as applicable. Instead of the gain controller, it would also be possible to use the two power measurement facilities $M_{IN}$, $M_{OUT}$ to adjust to a prescribed gain by regulation of the pump source PUMP. The same applies if the gain controller $G_{MONITOR}$ and the power measurement facility on the output side, $M_{OUT}$, are used.

In this case, output signals from the first power measurement facility $M_{IN}$ and the arrangement (here the gain controller $G_{MONITOR}$) for determining the mean inversion are fed to a table TAB, in which are stored various calibrated values of the power contributions $P_{11}^{ASE}$ of an amplified spontaneous emission, ASE. These contributions then supply directly the total ASE power of the optical fiber amplifier. The calibrated values in the table are the parameters $\tau_{11}(\chi_I)$ mentioned in FIG. 1, as a function of the mean inversion $\chi_I$.

Although similar in principle, an optical fiber amplifier with several amplifier stages V1, V2, V3, . . . would deviate slightly from one with a single amplifier stage if it is to be suitable for carrying out the method in accordance with the invention.

FIG. 3 takes, as a last exemplary embodiment, a three-stage optical fiber amplifier, at the input to each amplifier stage of which, V1, V2, V3 (with three serially-connected and pumped amplification fibers EDF1, EDF2, EDF3) is arranged a first power measurement facility $M_{IN1}$, $M_{IN2}$, $M_{IN3}$, . . . together with an arrangement for determining the mean inversion for the amplifier stage concerned using a second power measurement facility $M_{OUT1}$, $M_{OUT2}$, $M_{OUT3}$, . . . on the output side, or using a preset gain controller $G_{MONITOR1}$, $G_{MONITOR2}$, $G_{MONITOR3}$, . . .

As in FIG. 2, output signals from each of the first power measurement facilities $M_{IN1}$, $M_{IN2}$, $M_{IN3}$ and from the arrangement(s) for determining the mean inversion $G_{MONITOR1}$, $G_{MONITOR2}$, $G_{MONITOR3}$ are fed to the table TAB. However, the table TAB has far more calibrated-values than in FIG. 2, because the number of parameters $\tau_{11}(\chi_I)$, $\tau_{12}(\chi_I)$, $\tau_{22}(\chi_I)$, $\tau_{13}(\chi_I)$, $\tau_{23}(\chi_I, \chi_{II})$, $\tau_{33}(\chi_I, \chi_{II})$ required for determining the ASE in multi-state fiber amplifiers is larger. As already mentioned in the description of the method in accordance with the invention, the total ASE powers at the outputs of the individual stages are calculated from the various calibrated values (=parameters $\tau_{11}(\chi_I)$, $\tau_{12}(\chi_I)$, $\tau_{22}(\chi_I)$, $\tau_{13}(\chi_I)$, $\tau_{23}(\chi_I, \chi_{II})$) and the attenuations of the elements between the stages. Of these, a mere six parameters should provide the correct power contributions, but it may still be necessary to multiply them (by attenuation values $a_I$, $a_{II}$ and possibly constant gain values $G_0$) and then add them together. For this reason, following the table TAB is a linear adder $ADD_{LIN}$, the adding components of which are designed for the determination of the total power $P_{ASE}$ of the amplified spontaneous emission, ASE, arising at the output of the optical amplifier, using calibrated values selected from the table TAB. The multiplier in the adder ADD is required, in particular, if the tabulated values were calibrated without system-dependent factors $a_I$, $a_{II}$, $G_0$, . . . ), because a new weighting must be applied. The linear adder $ADD_{LIN}$ can also be used in recalibration of the values, e.g. in the case of an ageing effect or if there is a change in the configuration in the optical fiber amplifier.

The invention claimed is:

1. A method for determining a power of an amplified spontaneous emission in an optical fiber amplifier for a WDM signal, wherein the optical fiber amplifier includes at least a first amplifier stage having a predetermined output power set for a measured input power, and wherein the optical fiber amplifier includes a second amplifier stage connected in series after the first amplifier stage, comprising:

determining from the output power a first mean inversion level $\chi_I$ for the first amplifier stage, and determining a first output power of the amplified spontaneous emission at an output of the first amplifier stage by reference to tabulated values which depend on the first mean inversion level $\chi_I$, setting a second predetermined output power for a known output power from the first amplifier stage, whereby the gain of both amplifiers stages is kept constant so that the first mean inversion level $\chi_I$ and a second mean inversion level $\chi_{II}$ are linearly dependent, and calculating the power of an amplified spontaneous emission at an output of the second amplifier stage $P_2^{ASE}$ by adding $P_{12}^{ASE}$ and $P_{22}^{ASE}$, wherein:

$$P_{12}^{ASE} = \int_{\lambda_0}^{\lambda_1} S_I^{ASE}(\lambda, \chi_I) G_{II}^{ASE}(\lambda, \chi_{II}) a_i \, d\lambda,$$

-continued $$P_{22}^{ASE} = \int_{\lambda_0}^{\lambda_1} S_{II}^{ASE}(\lambda, \chi_{II}) d\lambda,$$

$S_I^{ASE}(\lambda,\chi_I)$ is a noise-power density dependent on the first mean inversion level, and $S_{II}^{ASE}(\lambda,\chi_{II})$ is a noise-power density dependent on the second mean inversion level, $G_{II}^{ASE}(\lambda,\chi_{II})$ is a gain of the second amplifier stage, and $a_I$ is an attenuation between the first amplifier stage and the second amplifier stage.

2. The method of claim 1, wherein:
for a second amplifier stage connected in series after the first amplifier stage, a second predetermined output power is set for a known output power from the first amplifier stage and from this a second mean inversion level determinable for the second amplifier stage,
for a gain which is constant across the two amplifier stages, and by reference to three tabulated values, which are dependent on one of the first mean inversion level and the second mean inversion level, a second output power is determined for the amplified spontaneous emission at one of the output from the first amplifier stage and an output of the second amplifier stage.

3. The method of claim 1, wherein
for a second amplifier stage connected in series after the first amplifier stage, a second predetermined output power is set for a known output power from the first amplifier stage, and from this a second mean inversion level is determined for the second amplifier stage,
by reference to tabulated values which depend on at least one of the first and second mean inversion levels, a second output power is determined for the amplified spontaneous emission at the output of the second amplifier stage.

4. The method of claim 3, wherein
two tabulated values, to which the ASE powers at outputs of the first and second amplifier stage are proportional, are calibrated before the determination of the total power, and
a further tabulated value, to which the ASE power at the output of the second amplifier stage is proportional, is calibrated before the determination of the total power.

5. The method of claim 3, wherein
for a third amplifier stage connected in series after the second amplifier stage, a third predetermined output power is set for a known output power from the second amplifier stage, and from this a third mean inversion level is determinable for the third amplifier stage (V3),
for a gain which is constant across the three amplifier stages and by reference to six tabulated values, four of which values are dependent on one of the mean inversion levels ($\chi_I, \chi_{II}, \chi_{III}$), and two of which values are dependent on two of the mean inversion levels, a third output power is determined for the amplified spontaneous emission at an output of the third amplifier stage.

6. The method of claim 3, wherein
for a third amplifier stage connected in series after the second amplifier stage, a third predetermined output power is set for a known output power from the second amplifier stage, and from this a third mean inversion level is determined for the third amplifier stage,
by reference to six tabulated values which are dependent on one to all of the mean inversion levels, a third output power is determined for the amplified spontaneous emission at an output of the third amplifier stage.

7. The method of claim 5, wherein three tabulated values, to which the ASE powers at outputs of the amplifier stages are proportional, are calibrated before the determination of a total power, and
two further tabulated values, to which in turn the ASE powers at outputs of the second and third amplifier stages are proportional, are calibrated before the determination of the total power, and
a last one tabulated value, which is proportional to a ratio of a power contribution from the second amplifier stage which is applied to the third amplifier stage to the total power, is calibrated before the determination of the total power.

8. The method of claim 5, wherein
when an optical fiber amplifier with more than three amplifier stages, further power contributions are determined for determining the total power of the amplified spontaneous emission of the optical fiber amplifier, and are added together to give total power values at the outputs of the individual amplifier stages.

9. The method of claim 8, wherein
all power contributions are determined using tabulated values which are saved in a precalibrated table.

10. The method of in claim 9, wherein
factors of proportionality between power contributions and the tabulated values, due to such system characteristics including at least one of attenuation values and overall gain values, are determined.

11. The method of claim 1, wherein
the tabulated values are regularly recalibrated, so that ageing or expansion effects in the optical fiber amplifier are taken into account.

12. An optical fiber amplifier with several amplifier stages, to the input of each of which is assigned a first power measurement facility, together with an arrangement for determining a mean inversion level for the amplifier stage concerned, using at least one of a second power measurement facility on an output side of the amplifier stage and a preset gain controller,
wherein output signals from the first power measurement facility and from the arrangement for the determination of the mean inversion level are fed to a table, in which, for individual amplifier stages and power contributions which are involved between amplifier stages,
various calibrated values of power contributions for an amplified spontaneous emission, are stored, and wherein
a linear adder is coupled to the table, adding components of which are designed for the determination of a total power of the amplified spontaneous emission, arising at the output from the optical amplifier, from calibrated values selected from the table;
wherein the optical fiber amplifier includes a first amplifier stage having a predetermined output power set for a measured input power and a second amplifier stage connected in series after the first amplifier stage;
wherein the determination of the power of the amplified spontaneous emission includes steps of:
determining from the output power, a first mean inversion level $\chi_I$ for the first amplifier stage, and
determining a first output power of the amplified spontaneous emission at an output of the first amplifier stage by reference to tabulated values which depend on the first mean inversion level $\chi_I$,
setting a second predetermined output power for a known output power from the first amplifier stage, whereby the gain of both amplifiers stages is kept constant so that the first mean inversion level $\chi_I$ and a second mean inversion level $\chi_{II}$ are linearly dependent, and calculating the power of an amplified spontaneous emission at an output of the second amplifier stage $P_2^{ASE}$ by adding $P_{12}^{ASE}$ and $P_{22}^{ASE}$, wherein:

$$P_{12}^{ASE} = \int_{\lambda_0}^{\lambda_1} S_I^{ASE}(\lambda, \chi_I) G_{II}^{ASE}(\lambda, \chi_{II}) a_i \, d\lambda,$$

$$P_{22}^{ASE} = \int_{\lambda_0}^{\lambda_1} S_{II}^{ASE}(\lambda, \chi_{II}) \, d\lambda,$$

$S_I^{ASE}(\lambda, \chi_I)$ is a noise-power density dependent on the first mean inversion level, and $S_{II}^{ASE}(\lambda, \chi_{II})$ is a noise-power density dependent on the second mean inversion level, $G_{II}^{ASE}(\lambda, \chi_{II})$ is a gain of the second amplifier stage, and $a_I$ is an attenuation between the first amplifier stage and the second amplifier stage.

13. The optical fiber amplifier of claim 12, wherein
the linear adder has a multiplier which weights each addition components from the table with system-dependent factors including attenuation values and constant gain values.

* * * * *